US011417205B1

(12) United States Patent
Durairaj et al.

(10) Patent No.: US 11,417,205 B1
(45) Date of Patent: Aug. 16, 2022

(54) METHOD AND SYSTEM FOR RAPID GRADUATED MOTOR VEHICLE DETECTION

(71) Applicant: UIPCO, LLC, San Antonio, TX (US)

(72) Inventors: Ravi Durairaj, San Antonio, TX (US); Gregory Brian Meyer, San Antonio, TX (US); Oscar Roberto Tijerina, San Antonio, TX (US); Sean Carl Mitchem, San Antonio, TX (US); Stacy Callaway Huggar, San Antonio, TX (US); Ruthie D. Lyle, Durham, NC (US); Nathan Lee Post, San Antonio, TX (US); Mark Anthony Lopez, Helotes, TX (US); Nolan Serrao, Plano, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 309 days.

(21) Appl. No.: 16/824,226

(22) Filed: Mar. 19, 2020

(51) Int. Cl.
*B60R 25/10* (2013.01)
*G08G 1/017* (2006.01)
*H04W 4/44* (2018.01)
*G08G 1/01* (2006.01)
*G06Q 50/26* (2012.01)

(52) U.S. Cl.
CPC ........... *G08G 1/0175* (2013.01); *G06Q 50/26* (2013.01); *G08G 1/0112* (2013.01); *H04W 4/44* (2018.02)

(58) Field of Classification Search
CPC .... G08G 1/0175; G08G 1/0112; G06Q 50/26; H04W 4/44
See application file for complete search history.

(56) References Cited

U.S. PATENT DOCUMENTS

| 9,361,546 B1* | 6/2016 | Smith | G06V 10/768 |
| 2005/0285721 A1* | 12/2005 | Bucholz | B60R 25/10 |
| | | | 340/937 |
| 2016/0098925 A1* | 4/2016 | Bhogal | G08G 1/205 |
| | | | 340/902 |
| 2016/0358031 A1* | 12/2016 | Miller | B60R 1/00 |
| 2019/0096215 A1* | 3/2019 | Shahid | G08B 21/02 |

FOREIGN PATENT DOCUMENTS

| CN | 104598905 | * | 5/2015 |
| CN | 110766967 | * | 2/2020 |

* cited by examiner

*Primary Examiner* — Hongmin Fan
(74) *Attorney, Agent, or Firm* — Plumsea Law Group, LLC

(57) ABSTRACT

Methods and systems for a graduated process of increasing bandwidth and increasing complexity to identify and confirm a location of a target vehicle based on information received from motor vehicles are described. In one embodiment, a method for detection of a target vehicle includes requesting, from one or more remote devices in a geographic area, information associated with a target vehicle. The method also includes receiving, from the one or more remote devices, information associated with the target vehicle. The method further includes determining whether the received information associated with the target vehicle matches the requested information. Upon determining that the received information matches the requested information, the method includes increasing at least one of a bandwidth or a complexity level of the requested information associated with the target vehicle and decreasing the geographic area associated with the request.

20 Claims, 11 Drawing Sheets

METHOD AND SYSTEM FOR RAPID GRADUATED MOTOR VEHICLE DETECTION

BACKGROUND

The present embodiments relate to communication between vehicles and infrastructure in general, and more particularly, to methods and systems for rapid graduated motor vehicle detection.

During emergency or exigent circumstances, law enforcement, rescue personnel, or other authorities may need to quickly locate a specific vehicle on the roads within a geographic area. For example, the vehicle or its occupants may have been involved in a crime or a driver or passenger may be experiencing a medical condition. In these circumstances, it may not be easy to find the vehicle's location on the roads so that law enforcement or rescue personnel can be quickly dispatched to intercept the vehicle. Conventional techniques include using an all-points bulletin (APB) or a "be on the lookout" (BOLO) broadcast to law enforcement or other authorities in the geographic area with a description of the suspect vehicle and its probable heading along candidate roads.

However, these conventional techniques rely on a small number of people to observe hundreds or thousands of vehicles in a given area and determine if any of those vehicles match the suspect vehicle. Other conventional techniques can include radio broadcasts or electronic road signs that communicate suspect vehicle information to the public. These techniques rely on ordinary, untrained public citizens to receive the suspect vehicle information and then properly observe and/or report any potential sightings to law enforcement.

Accordingly, there is a need in the art for a system and method that addresses these shortcomings discussed above.

SUMMARY

In one aspect, a method for detection of a target vehicle is provided. The method includes requesting, from one or more remote devices in a geographic area, information associated with a target vehicle. The method also includes receiving, from the one or more remote devices, information associated with the target vehicle. The method further includes determining whether the received information associated with the target vehicle matches the requested information. Upon determining that the received information matches the requested information, the method includes increasing at least one of a bandwidth or a complexity level of the requested information associated with the target vehicle and decreasing the geographic area associated with the request.

In another aspect, a method for implementing a graduated process of increasing bandwidth and increasing complexity to identify and confirm a location of a target vehicle in a geographic area is provided. The method includes requesting, from one or more remote devices in a first geographic area, a first level of information associated with a target vehicle. The method also includes receiving, from the one or more remote devices, information matching the first level of information associated with the target vehicle. Based on the received information matching the first level of information, the method also includes calculating a second geographic area that is smaller than the first geographic area. The method further includes requesting, from one or more remote devices in the second geographic area, a second level of information associated with the target vehicle, wherein the second level of information has at least one of an increased bandwidth or an increased complexity than the first level of information.

In another aspect, a system for detection of a target vehicle is provided. The system includes a plurality of remote devices associated with vehicles traveling along roads in a geographic area. The system also includes a server including a processor in communication with the plurality of remote devices via a communication network. The processor of the server is configured to request, from the one or more remote devices, information associated with a target vehicle. The processor is also configured to receive, from the one or more remote devices, information associated with the target vehicle and determine whether the received information associated with the target vehicle matches the requested information. Upon determining that the received information matches the requested information, the processor is further configured to increase at least one of a bandwidth or a complexity level of the requested information associated with the target vehicle and decrease the geographic area associated with the request.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

According to the principles of the example embodiments described herein, a method and system for rapid graduated vehicle detection are provided. The techniques of the present embodiments provide a mechanism for a graduated process of increasing bandwidth and increasing complexity to identify and confirm a location of a target vehicle based on information received from motor vehicles.

Figure 1:
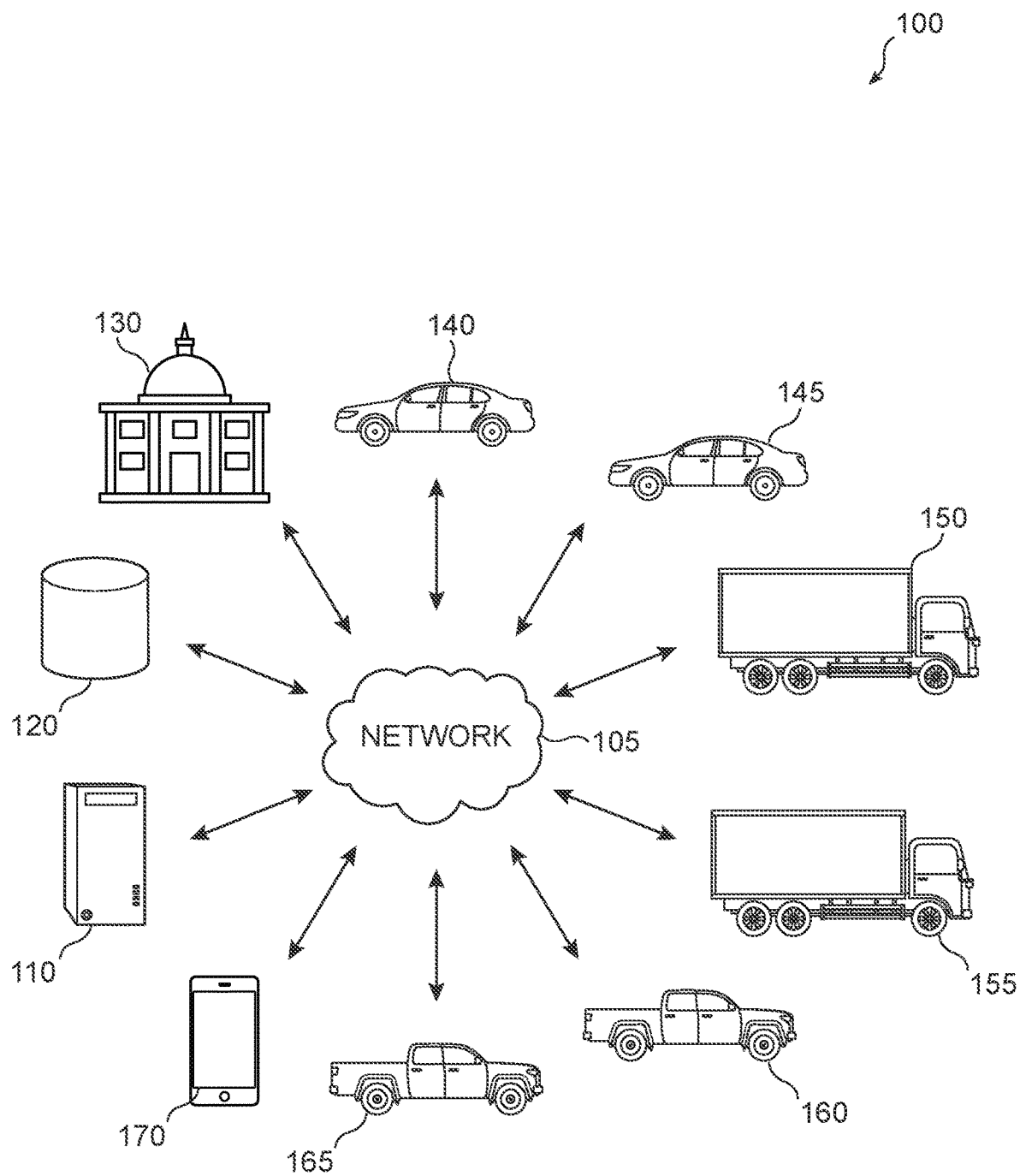
FIG. 1 is a schematic view of an example embodiment of components of a rapid graduated vehicle detection system interacting with a network.

Referring now to FIG. 1, components of a rapid graduated vehicle detection system 100 (also referred to herein as "system 100") for rapidly detecting a target vehicle with an increasing level of detail (i.e., bandwidth and/or complexity) based on information received from participating vehicles is shown interacting with a network 105. In an example embodiment, system 100 includes at least a server 110 in communication with network 105. Network 105 may be a communication network that uses any form of wireless communication technology, including, but not limited to cellular telecommunication networks (e.g., 3G, 4G, 5G, LTE, etc.) or other wireless wide-area networks (WWAN) and/or wireless local-area networks (WLAN).

In an example embodiment, server 110 is a computer including at least one processor that is configured to execute instructions for implementing the techniques according to the example embodiments described herein. For example, server 110 may be configured to analyze information received via network 105 about a target vehicle from one or more participating vehicles in communication with network 105. Additionally, server 110 may be configured to communicate with the one or more participating vehicles via network 105 to provide information associated with the target vehicle, including license plate numbers, make, model, color, etc., locations of interest for identifying the target vehicle, an amount of bandwidth or type of information associated with the target vehicle that is requested (e.g., text character recognition, low resolution images, high resolution video, etc.), or other relevant information for the target vehicle being sought.

In some embodiments, system 100 may further include a database 120 in communication with server 110 via network 105. Database 120 may include various information and data used by system 100 for rapidly detecting a target vehicle, including, but not limited to map data for different geographic areas of varying sizes (e.g., roads, streets, locations, etc. associated with geographic regions, zones, sectors, etc.), information associated with a plurality of vehicles and/or devices associated with vehicles participating or in communication with system 100, criteria or other information used by system 100 for determining matches between the received information and the target vehicle (e.g., probability requirements, match or similarity thresholds, etc.), as well as other information that may be used by system 100 for rapidly detecting a target vehicle. System 100 and/or server 110 may access database 120 via network 105 for use in implementing the techniques of the example embodiments described herein.

In some embodiments, system 100 may further include a law enforcement agency 130, such as a police department or other government authorities. Law enforcement agency 130 may contribute information or data about target vehicles to system 100, including initiating a request to locate a specific target vehicle. In some embodiments, a target vehicle may be involved or associated with a crime or other incident. For example, law enforcement agency 130 may initiate a search for a target vehicle using system 100 based on information including but not limited to an all-points bulletin (APB), a "be on the lookout" (BOLO) broadcast, an AMBER alert (e.g., for child abduction situations), a Silver alert (e.g., for missing senior citizens or persons with cognitive impairments), or other emergency or exigent situation in which locating a target vehicle is needed.

Many vehicles traveling on roads are now equipped with data-gathering sensors that are capable of capturing images and/or video of other vehicles on the road. Some types of these sensors can be built into the vehicle and are used for various vehicle functions, such as lane keeping, automatic braking, adaptive cruise control, etc. Other types of sensors can be added to the vehicle, either as accessories, such as dash cameras, or are used in the vehicle on a temporary basis, such as cellular phones or tablets with cameras that are used for navigation or vehicle telemetry.

In an example embodiment, vehicle detection system 100 may include a plurality of participating vehicles, including vehicles of different types, categories, weights, etc. For example, as shown in FIG. 1, system 100 may include one or more vehicles of a first type, such as passenger vehicles (e.g., sedans, coupes, wagons, etc.), including a first vehicle 140 and a second vehicle 145. System 100 may also include one or more vehicles of a second type, such as commercial heavy trucks or machines (e.g., tractor-trailers, box trucks, other large and/or heavy-duty vehicles), including a third vehicle 150 and a fourth vehicle 155. System 200 may further include one or more vehicles of a third type, such as small or light trucks or utility vehicles (e.g., pick-ups, SUVs, CUVs, vans, campers, etc.), including a fifth vehicle 160 and a sixth vehicle 165. It should also be understood that system 100 may include additional other types or categories of participating vehicles other than the examples shown in reference to FIG. 1.

In an example embodiment, each of the plurality of participating vehicles (e.g., one or more of first vehicle 140, second vehicle 145, third vehicle 150, fourth vehicle 155, fifth vehicle 160, and sixth vehicle 165) may be equipped with data-gathering sensors that are configured to capture images, video, and other data associated with other vehicles on the roads. Additionally, in some embodiments, system 100 may further include devices equipped with a camera or other types of data-gathering sensors, such as, for example, a mobile device 170, that may be used in a participating vehicle to capture data or information associated with other vehicles.

While six representative participating vehicles (e.g., vehicles 140, 145, 150, 155, 160, 165) are shown in the example depicted in FIG. 1, it should be understood that in various embodiments, system 100 may include a large number of participating vehicles and mobile devices associated with vehicles. For example, in a given geographic area, system 100 may include hundreds, thousands, or more individual vehicles and/or mobile devices associated with vehicles that are available for use by system 100 to locate a target vehicle. With this configuration, system 100 may receive information of varying degrees or amounts of complexity and/or bandwidth from the various data-gathering sensors associated with the plurality of participating vehicles (e.g., vehicles 140, 145, 150, 155, 160, 165) or mobile devices associated with vehicle (e.g., mobile device 170) to locate a target vehicle within a geographic area. Using the received information, the identity and location of the target vehicle may be rapidly detected and confirmed.

According to the techniques of the present embodiments, system 100 implements a graduated process of increasing bandwidth and increasing complexity to identify and confirm the location of a target vehicle. An example scenario of implementing this process will be described with reference to FIGS. 2-10, as detailed below. As used and described below, the example embodiments include geographic areas of varying sizes that may be used to narrow the search radius for a target vehicle. As used herein, the geographic areas include a region, which is the largest, followed by a zone, which is smaller than the region, but larger than a sector, which is the smallest (i.e., region>zone>sector). However, it should be understood that, regardless of terminology, different sized search areas may be used within a geographic area to locate a target vehicle.

Additionally, in some embodiments, the search radius for a target vehicle may be varied from largest to smallest in relation to the amount of bandwidth and/or complexity of information associated with a target vehicle that is to be captured by participating vehicles and provided to system 100. In other words, in a first geographic area (e.g., a target region) that is the largest, a first level of information is requested, where the first level of information may be associated with a first bandwidth range (e.g., a low bandwidth) and/or a first degree of complexity (e.g., a low complexity). In a second geographic area (e.g., a target zone) that is smaller than the first geographic area, a second level of information is requested. The second level of information may be associated with a second bandwidth range (e.g., a medium bandwidth that is greater than the first bandwidth range) and/or a second degree of complexity (e.g., a medium complexity that is greater than the first degree of complexity). In a third geographic area (e.g., a target sector) that is smaller than both the first geographic area and the second geographic area, a third level of information is requested. The third level of information may be associated with a third bandwidth range (e.g., a high bandwidth that is greater than both the first bandwidth and the second bandwidth ranges) and/or a third degree of complexity (e.g., a high complexity that is greater than both the first degree of complexity and the second degree of complexity).

Figure 2:
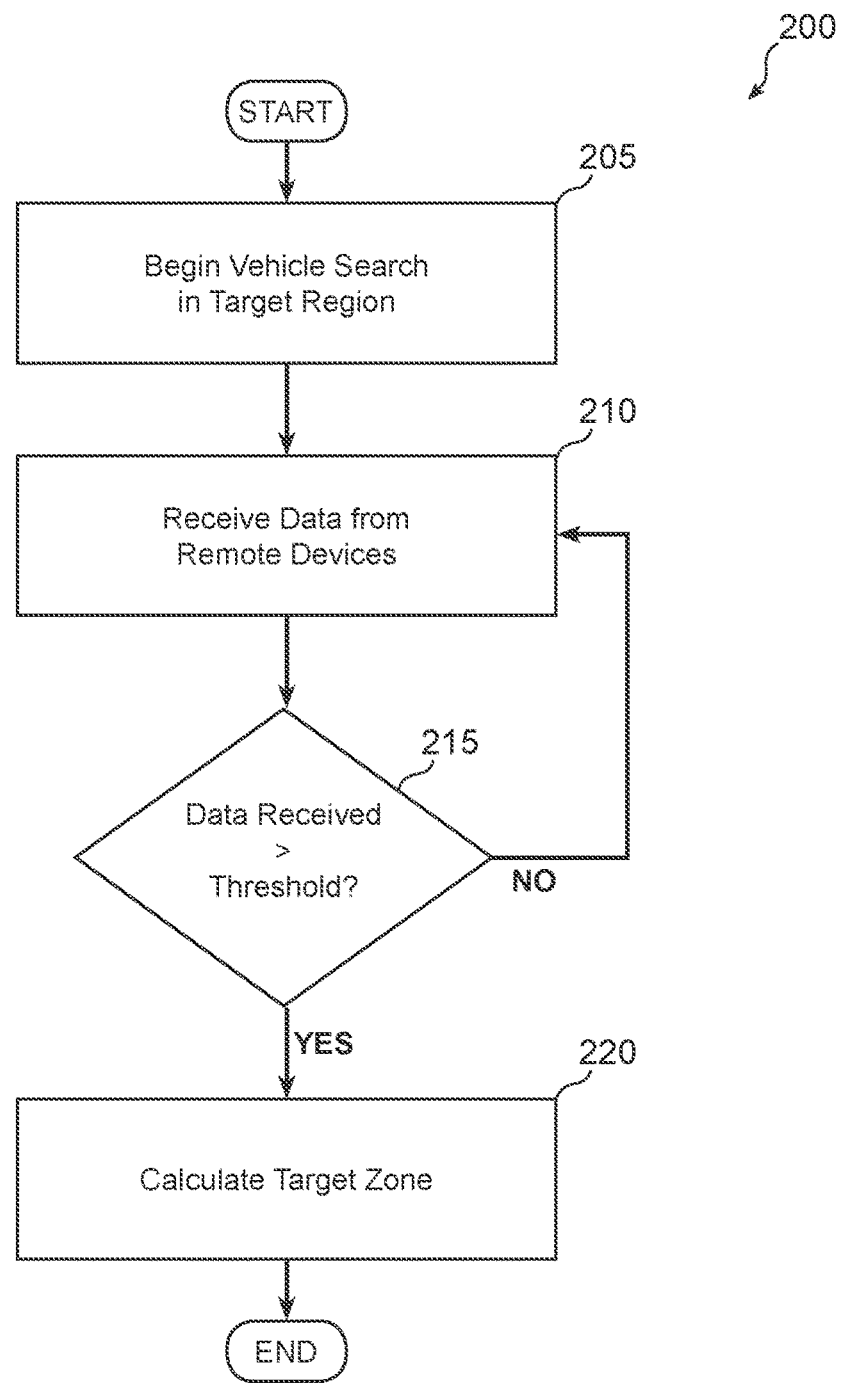
FIG. 2 is a flowchart of an example embodiment of a method for calculating a target vehicle zone.

Referring now to FIG. 2, a flowchart of an example embodiment of a method 200 for calculating a target vehicle zone is shown. In an example embodiment, method 200 may be implemented by at least one processor associated with system 100, for example, at least one processor associated with server 110, described above. In this embodiment, method 200 may begin at an operation 205. At operation 205, a search for a target vehicle is begun in a target region by requesting information associated with the target vehicle from one or more participating remote devices (e.g., vehicles 140, 145, 150, 155, 160, 165, and/or mobile device(s) 170, shown in FIG. 1 above).

In an example embodiment, the search begins with a request to one or more participating remote devices (i.e., vehicles and/or mobile devices) for a first level of information associated with the target vehicle. For example, at operation 205, system 100 distributes a license plate number of the target vehicle to the participating remote devices. In this example, the first level of information (e.g., the license plate number) has a low level of complexity (i.e., only text character recognition) and does not require a large amount of bandwidth (i.e., license plate numbers are typically only 6-8 characters in length). The participating remote devices will use their data-gathering sensors, for example, onboard cameras, to look for the target vehicle in the target region.

In some embodiments, system 100 may implement edge computing techniques such that a participating vehicle's or mobile device's onboard processors only need to conduct the initial character recognition analysis from the camera feed to detect the license plate number. Further processing, such as probability requirements, match or similarity thresholds, etc. that can be used to determine a match with the target vehicle is performed by processors associated with system 100, such as processors associated with server 110.

Next, method 200 proceeds to an operation 210. At operation 210, the one or more participating remote devices provide their data or information to the system for analysis. For example, at operation 210, system 100 receives data associated with the first level of information (e.g., the license plate number) for the target vehicle from one or more of the participating vehicles (e.g., vehicles 140, 145, 150, 155, 160, 165) or mobile devices (e.g., mobile device(s) 170).

At an operation 215, method 200 includes determining whether or not the received data matches the information requested for the target vehicle. For example, at operation 215, system 100 analyzes the data from the participating remote devices to determine whether any of the data matches the requested first level of information for the target vehicle. In some embodiments, a match threshold or probability requirement may be used to determine whether the information is a match. For example, at operation 215, the data received may be compared to a threshold value, above which a match is considered to have been found. In an example embodiment, the threshold value may be a percentage or probability that is less than 100% so that a partial match to the information requested for the target vehicle is considered a match.

In one embodiment, the threshold value may be 50% or higher, 60% or higher, 70% or higher, or some other amount. In other embodiments, the threshold value may be based on the information requested, so that, for example, when comparing text character recognition data associated with a license plate number having 6, 7, or 8 characters, the threshold value at operation 215 may be set to a specific number of characters (e.g., 4 of 6 characters, 5 of 7 characters, etc.) to determine a match.

Upon determining at operation 215 that a match has not been made (i.e., the decision is NO, the data received is not greater than the threshold), then method may proceed back to operation 210 where system 100 continues to receive data from the participating remote devices. Additionally, in some embodiments, upon one or more iterations of operation 215 without a match being determined, the threshold value used for operation 215 may be adjusted. For example, in the case of a license plate number, a threshold value that requires matching 5 of 7 characters may be lowered to 4 of 7 characters to improve the likelihood of finding a match at operation 215.

Upon determining at operation 215 that a match has been found (i.e., the decision is YES, the data received is greater than the threshold), then method 200 proceeds to an operation 220. For example, if a match of the first level of information associated with the target vehicle is found at operation 215, the participating vehicle or mobile device reports the match and its current location to system 100, for example, to server 110. At operation 220, the location of the participating remote device(s) that identified the target vehicle based on the first level of information may be used to calculate a target vehicle zone. That is, the target vehicle zone calculated at operation 220 has a smaller radius or extent than the target region used in operation 205 at the beginning of method 200. In this way, the geographic area in which the target vehicle is being sought becomes narrower or smaller based on the successful identification of the first level of information about the target vehicle (e.g., the license plate number).

Figure 3:
FIG. 3 is a representational view of an embodiment of a map of a target vehicle region according to an example embodiment.

FIG. 3 illustrates a map 300 of a target vehicle region 305 according to an example embodiment. In one embodiment, the geographic area in which the search for the target vehicle may be initiated is target vehicle region 305 (e.g., as part of operation 205 of method 200, described above). In this embodiment, target vehicle region 305 includes a plurality of roads of various sizes and categories, including a first highway 310, a second highway 320, and a first street 330. Target vehicle region 305 may further include additional roads of different levels of sizes and categories. Method 200 may be used to determine one or more matches with the information associated with the target vehicle, as described above. In this embodiment, each instance of a successful match (e.g., the decision at operation 215 of method 200 is YES), is marked with an alert 340 on map 300 of target vehicle region 305. As shown in FIG. 3, a series of alerts 340 are located along first highway 310 within target vehicle region 305. That is, FIG. 3 illustrates that multiple instances of successful matches to the license plate number associated with the target vehicle have been found within target vehicle region 305.

Figure 4:
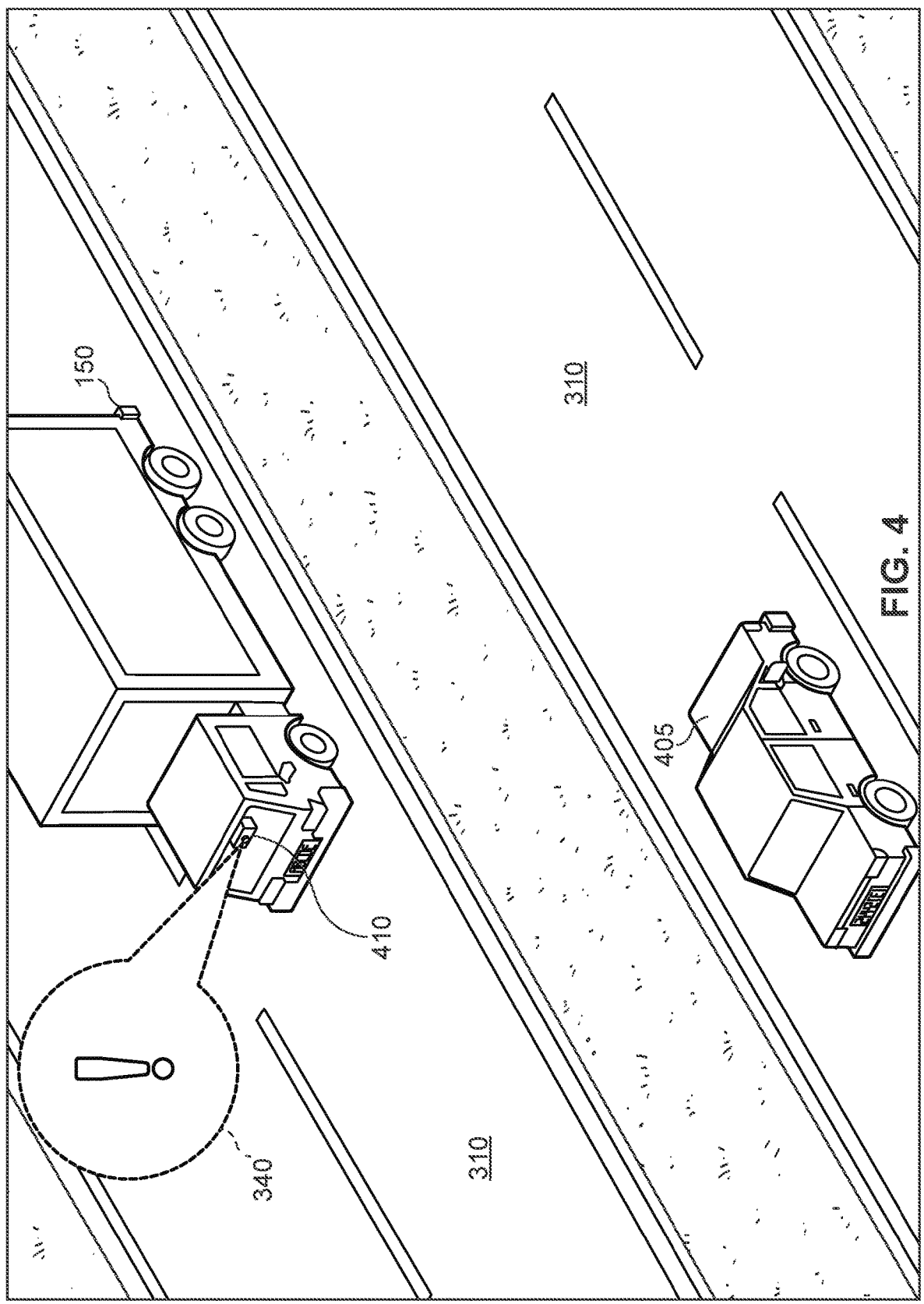
FIG. 4 is a representational view of an example embodiment of an alert generated upon recognizing a target vehicle.

FIG. 4 illustrates an example embodiment of an alert generated upon recognizing a target vehicle. In this embodiment, a participating vehicle, for example, third vehicle 150, has received the request from system 100 for information about a target vehicle 405. As third vehicle 150 is traveling along first highway 310 in the geographic area of interest (e.g., target vehicle region 305, shown in FIG. 3), one or more data-gathering sensors associated with third vehicle 150, for example, a dash camera 410 mounted in third vehicle 150, are capturing information about passing vehicles. For example, in this embodiment, system 100 has requested that the participating vehicles search for a first level of information associated with target vehicle 405 in the form of a license plate number.

Accordingly, in this embodiment, dash camera 410 associated with third vehicle 150 uses a text character recognition algorithm or program to read the license plate numbers of nearby vehicles on first highway 310 as third vehicle 150 travels within target vehicle region 305. As shown in FIG. 4, when third vehicle 150 passes target vehicle 405 going in the opposite direction on first highway 310, dash camera 410 is able to read the license plate number of target vehicle 405 and match it to the information requested by system 100. As a result of the match, third vehicle 150 generates alert 340 and provides the information associated with the match to server 110 of system 100. For example, third vehicle 150 may provide data associated with the match (e.g., the percentage or number of matching characters of the license plate number), as well as other relevant information, such as the location and/or heading of third vehicle 150 when the match was made and the location and heading of target vehicle 405.

In some embodiments, upon determining that the match has been made, third vehicle 150 can also increase the number and/or quality of sensors and increase the bandwidth of the reported data. For example, additional cameras, like a backup camera or a 360 view camera can be turned on to capture additional data associated with target vehicle 405, such as images or video. In some embodiments, server 110 of system 100 can also inform other participating vehicles or devices in close proximity of the last reported location of target vehicle 405 in target vehicle region 305 to turn on their cameras and/or sensors.

Using the information provided by one or more participating vehicles or devices that generate a match to the first level of information about target vehicle 405, system 100 may generate a smaller search area or radius, such as a target vehicle zone, that narrows the area in which the search is focused from the larger target vehicle region 305. For example, the target vehicle zone may be determined as described above in reference to operation 220 of method 200.

Figure 5:
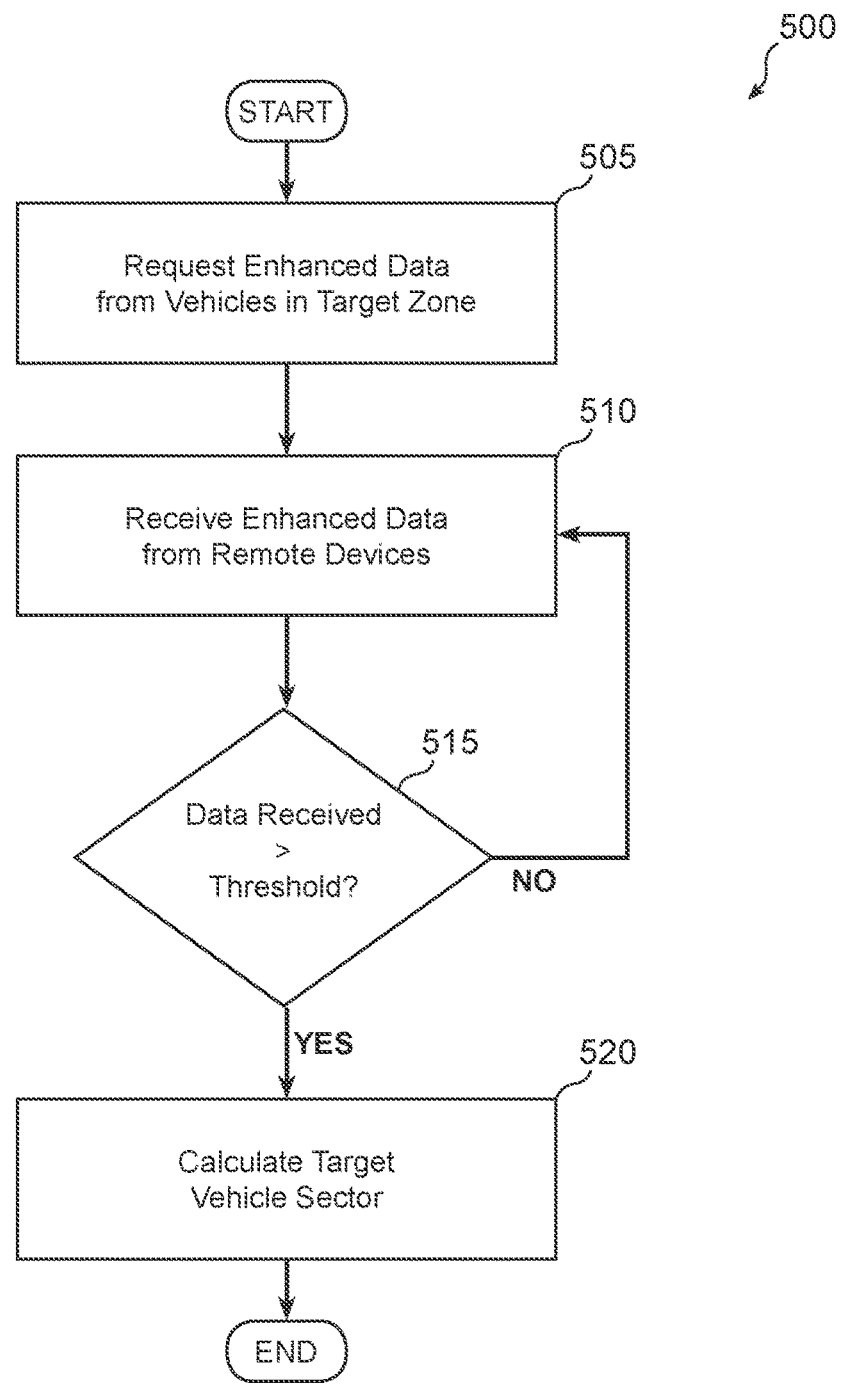
FIG. 5 is a flowchart of an example embodiment of a method for calculating a target vehicle sector.

Referring now to FIG. 5, a flowchart of an example embodiment of a method 500 for calculating a target vehicle sector is shown. In an example embodiment, method 500 may be implemented by at least one processor associated with system 100, for example, at least one processor associated with server 110, described above. In this embodiment, method 500 may begin at an operation 505. At operation 505, enhanced data associated with the target vehicle, such as images or video, is requested from the participating remote devices (e.g., vehicles and/or mobile devices) in the target vehicle zone (e.g., as calculated in operation 220 of method 200, above). For example, having already received at least one alert (e.g., alert 340) from a participating vehicle (e.g., third vehicle 150) that a match for the first level of information about the target vehicle was made, system 100 may request a second level of information (e.g., enhanced data) associated with the target vehicle from the participating remote devices in the target vehicle zone.

For example, as described above, the second level of information may be associated with a second bandwidth range (e.g., a medium bandwidth that is greater than the first bandwidth range) and/or a second degree of complexity (e.g., a medium complexity that is greater than the first degree of complexity). In this embodiment, the second level of information includes enhanced data, such as still images or video having a sufficient resolution to determine identifying characteristics associated with the target vehicle, including, for example, a make, model, color, and/or type of vehicle. The participating remote devices will use their data-gathering sensors, for example, onboard cameras, to look for and capture enhanced data associated with the target vehicle in the target vehicle zone.

Next, method 500 proceeds to an operation 510. At operation 510, the one or more participating remote devices provide their enhanced data or information to the system for analysis. For example, at operation 510, system 100 receives data associated with the second level of information (e.g., the enhanced data) for the target vehicle from one or more of the participating remote devices (e.g., vehicles 140, 145, 150, 155, 160, 165 and/or mobile device(s) 170, as shown in FIG. 1 above).

At an operation 515, method 500 includes determining whether or not the received enhanced data matches the information requested for the target vehicle. For example, at operation 515, system 100 analyzes the enhanced data from the participating remote devices to determine whether any of the data matches the requested second level of information for the target vehicle. In some embodiments, a match threshold or probability requirement may be used to determine whether the information is a match. For example, at operation 515, the data received may be compared to a threshold value, above which a match is considered to have been found. In an example embodiment, the threshold value may be a percentage or probability that is less than 100% so that a partial match to the information requested for the target vehicle is considered a match, for example, as previously described above in reference to method 200 shown in FIG. 2.

Upon determining at operation 515 that a match has not been made (i.e., the decision is NO, the data received is not greater than the threshold), then method may proceed back to operation 510 where system 100 continues to receive enhanced data from the participating remote devices. Additionally, in some embodiments, upon one or more iterations of operation 515 without a match being determined, the threshold value used for operation 515 may be adjusted, as described above.

Upon determining at operation 515 that a match has been found (i.e., the decision is YES, the data received is greater than the threshold), then method 500 proceeds to an operation 520. For example, if a match of the second level of information associated with the target vehicle is found at operation 515, the participating vehicle or mobile device reports the match and its current location to system 100, for example, to server 110. At operation 520, the location of the participating remote device(s) that identified the target vehicle based on the second level of information may be used to calculate a target vehicle sector. That is, the target vehicle sector calculated at operation 520 has a smaller radius or extent than the target vehicle zone used in operation 505 at the beginning of method 500. In this way, the geographic area in which the target vehicle is being sought becomes narrower or smaller based on the successful identification of the second level of information about the target vehicle (e.g., the enhanced data).

Figure 6:
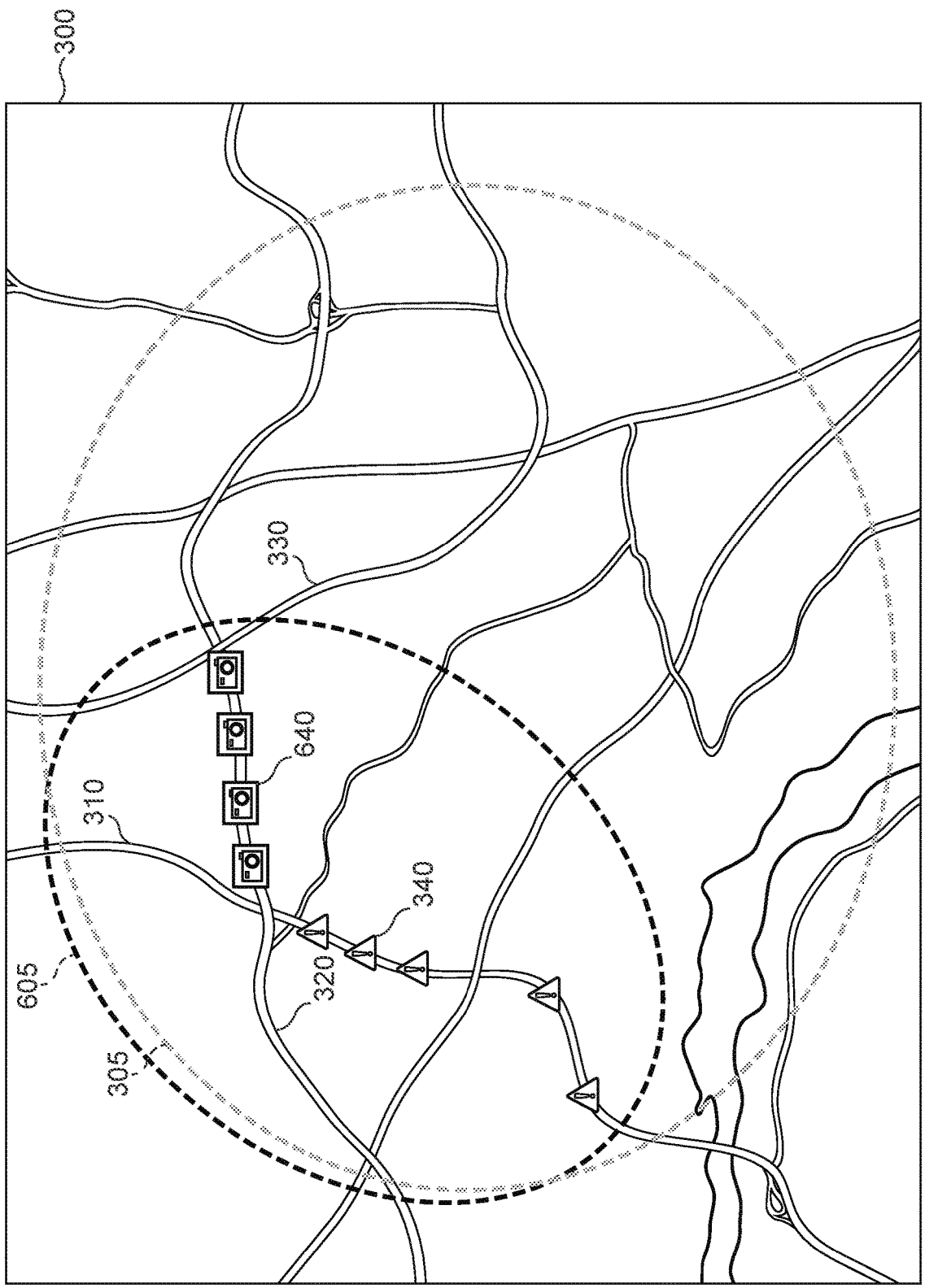
FIG. 6 is a representational view of an embodiment of a map of a target vehicle zone according to an example embodiment.

FIG. 6 illustrates map 300 showing target vehicle region 305 from FIG. 3 and a target vehicle zone 605 according to an example embodiment. In one embodiment, the geographic area in which the search for the target vehicle is focused is narrowed from target vehicle region 305 to the smaller target vehicle zone 605 (e.g., as part of operation 505 of method 500, described above). In this embodiment, target vehicle zone 605 includes one or more of the plurality of roads of various sizes and categories that are in proximity to the location of the series of alerts 340 generated based on the initial search (e.g., matches to the first level of information associated with the target vehicle).

For example, in this embodiment, alerts 340 were found along first highway 310. As a result, target vehicle zone 605 includes at least first highway 310, as well as other roads in close proximity, including second highway 320, and portions of first street 330. Method 500 may be used to determine one or more matches with the second level of information associated with the target vehicle (e.g., the enhanced data), as described above. In this embodiment, each instance of a successful match (e.g., the decision at operation 515 of method 500 is YES), is illustrated by an icon 640 on map 300 of target vehicle zone 605. As shown in FIG. 6, a series of icons 640 are located along second highway 320 within target vehicle zone 605. That is, FIG. 6 illustrates that multiple instances of successful matches to the enhanced data associated with the target vehicle have been found within target vehicle zone 605. Additionally, icons 640 may also be used to determine the direction of travel of the target vehicle within the target vehicle zone 605.

Figure 7:
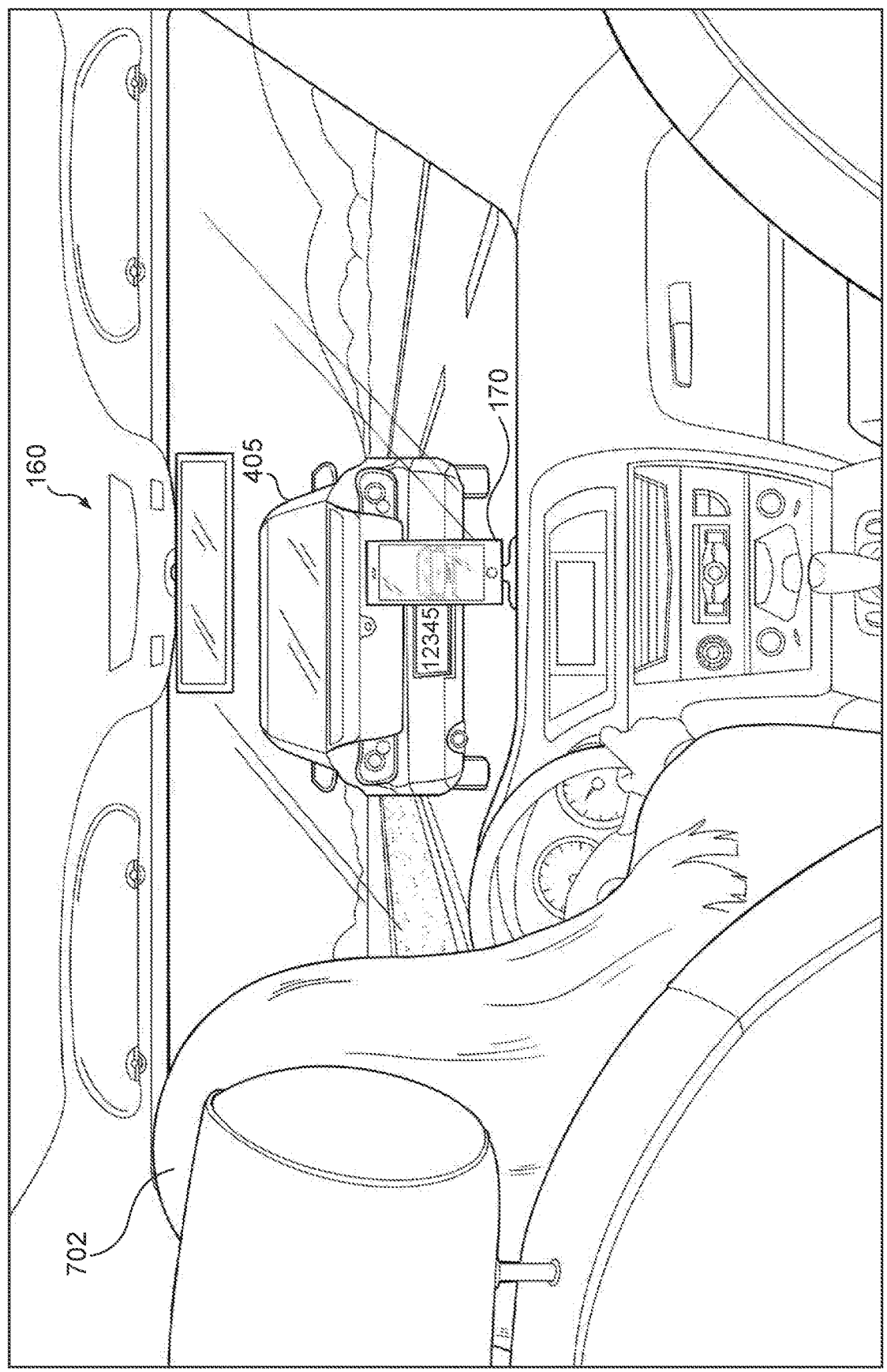
FIG. 7 is a representational view of an example embodiment of a target vehicle being recognized by a mobile device.

Referring now to FIG. 7, a representational view of an example embodiment of target vehicle 405 being recognized by a mobile device is shown. In this embodiment, a participating vehicle, for example, fifth vehicle 160 that includes mobile device 170, is traveling within target vehicle zone 605, as shown in FIG. 6 above. As shown in FIG. 7, in response to the request for the second level of information associated with target vehicle 405 (e.g., enhanced data), a driver 702 of fifth vehicle 160 captures images and/or video of target vehicle 405 using mobile device 170. For example, the enhanced data captured by mobile device 170 may include sufficient detail to identify characteristics associated with target vehicle 405, including, but not limited to make, model, color, etc. Driver 702 may then send the captured enhanced data to server 110 of system 100 for further analysis and processing according to the techniques described herein.

Figure 8:
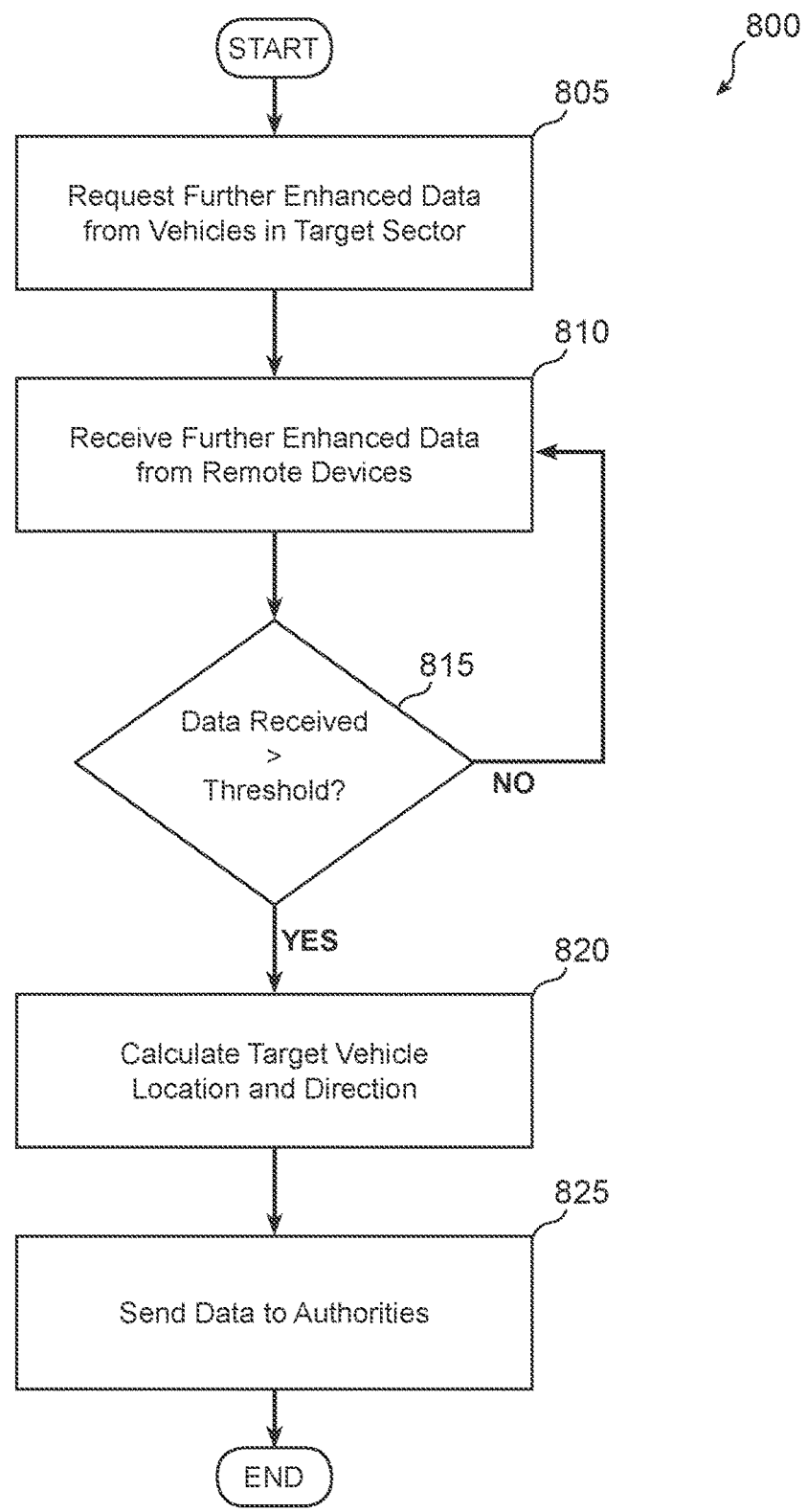
FIG. 8 is a flowchart of an example embodiment of a method for calculating a target vehicle location and direction.

Referring now to FIG. 8, a flowchart of an example embodiment of a method 800 for calculating a target vehicle location and direction is shown. In an example embodiment, method 800 may be implemented by at least one processor associated with system 100, for example, at least one processor associated with server 110, described above. In this embodiment, method 800 may begin at an operation 805. At operation 805, further enhanced data associated with the target vehicle, such as live video or high-resolution images, is requested from the participating remote devices (e.g., vehicles and/or mobile devices) in the target vehicle sector (e.g., as calculated in operation 520 of method 500, above). For example, having already received enhanced data (e.g., represented by icons 640 shown in FIG. 6) from one or more participating devices (e.g., fifth vehicle 160 and mobile device 170, as shown in FIG. 7) matching the second level of information about the target vehicle, system 100 may request a third level of information (e.g., further enhanced data) associated with the target vehicle from the participating remote devices in the target vehicle sector.

For example, as described above, the third level of information may be associated with a third bandwidth range (e.g., a high bandwidth that is greater than both the first bandwidth and the second bandwidth ranges) and/or a third degree of complexity (e.g., a high complexity that is greater than both the first degree of complexity and the second degree of complexity). In this embodiment, the third level of information includes further enhanced data, such as live video or high-resolution images having a higher resolution than the previous enhanced data. This further enhanced data may have a sufficiently detailed resolution not only to determine identifying characteristics associated with the target vehicle, as described above, but also to capture information about the target vehicle occupants and/or to provide real-time data, such as live video or current speed, direction, and/or heading information. The participating remote devices will use their data-gathering sensors, for example, onboard cameras, to look for and capture further enhanced data associated with the target vehicle in the target vehicle sector.

Next, method 800 proceeds to an operation 810. At operation 810, the one or more participating remote devices provide their further enhanced data or information to the system for analysis. For example, at operation 810, system 100 receives data associated with the third level of information (e.g., the further enhanced data) for the target vehicle from one or more of the participating remote devices (e.g., vehicles 140, 145. 150, 155, 160, 165 and/or mobile device(s) 170, as shown in FIG. 1 above).

At an operation 815, method 800 includes determining whether or not the received further enhanced data matches the information requested for the target vehicle. For example, at operation 815, system 100 analyzes the further enhanced data from the participating remote devices to determine whether any of the data matches the requested third level of information for the target vehicle. In some embodiments, a match threshold or probability requirement may be used to determine whether the information is a match. For example, at operation 815, the data received may be compared to a threshold value, above which a match is considered to have been found. In an example embodiment, the threshold value may be a percentage or probability that is less than 100% so that a partial match to the information requested for the target vehicle is considered a match, for example, as previously described above in reference to method 200 shown in FIG. 2.

Upon determining at operation 815 that a match has not been made (i.e., the decision is NO, the data received is not greater than the threshold), then method may proceed back to operation 810 where system 100 continues to receive further enhanced data from the participating remote devices. Additionally, in some embodiments, upon one or more iterations of operation 815 without a match being determined, the threshold value used for operation 815 may be adjusted, as described above.

Upon determining at operation 815 that a match has been found (i.e., the decision is YES, the data received is greater than the threshold), then method 800 proceeds to an operation 820. For example, if a match of the third level of information associated with the target vehicle is found at operation 815, the participating vehicle or mobile device reports the match and its current location to system 100, for example, to server 110. At operation 820, the location of the participating remote device(s) that identified the target vehicle based on the third level of information may be used to calculate a location and/or direction of the target vehicle.

Additionally, in some embodiments, method 800 may further include an operation 825 where the data associated with the target vehicle that has been obtained by the participating remote devices is sent to the authorities. For example, at operation 825, server 110 of system 100 may send the target vehicle location and/or direction obtained from operation 820 to law enforcement agency 130, such as a police department or other government authorities. In some cases, this may be the same authorities that initiated the request using system 100. In other cases, however, the authorities may be a law enforcement agency that is located in the jurisdiction in which the target vehicle has been located at operation 820. For example, if the target vehicle travels across state lines or other jurisdictional boundaries, system 100 can report the location and/or direction of the target vehicle to the appropriate authorities in the jurisdiction in which the target vehicle is now located.

With this configuration, system 100 may be used to implement a graduated process of increasing bandwidth and increasing complexity to identify and confirm the location of a target vehicle in a geographic area.

Figure 9:
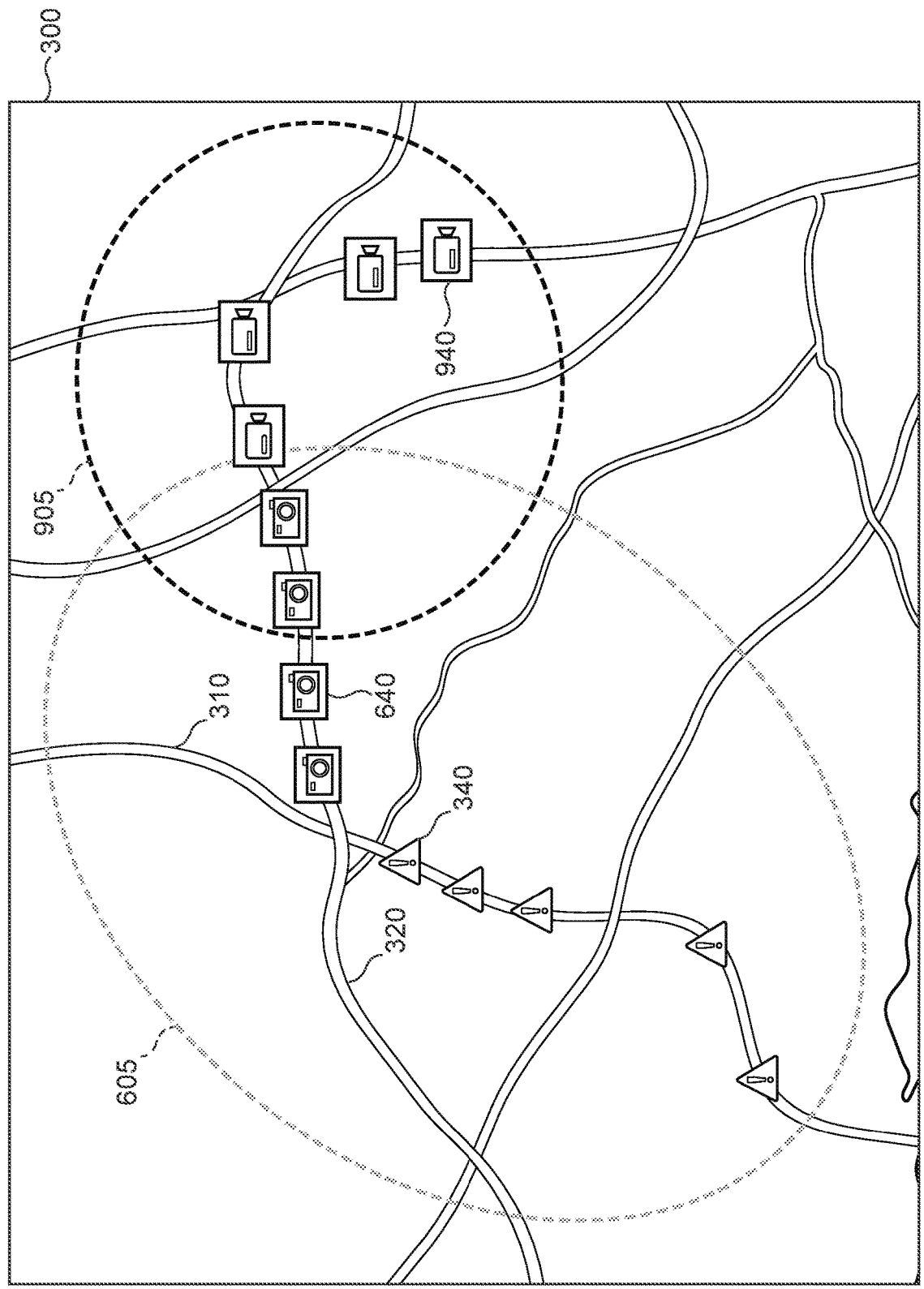
FIG. 9 is a representational view of an embodiment of a map of a target vehicle sector according to an example embodiment.

FIG. 9 illustrates an enlarged portion of map 300 showing target vehicle zone 605 from FIG. 6 and a target vehicle sector 905 according to an example embodiment. In one embodiment, the geographic area in which the search for the target vehicle is focused is again narrowed from target vehicle zone 605 to the smaller target vehicle sector 905 (e.g., as part of operation 805 of method 800, described above). In this embodiment, target vehicle sector 905 includes one or more of the plurality of roads of various sizes and categories that are in proximity to the location of the series of icons 640 generated based on the search for enhanced data (e.g., matches to the second level of information associated with the target vehicle).

For example, in this embodiment, icons 640 represent enhanced data associated with the target vehicle obtained along second highway 320. As a result, target vehicle sector 905 includes at least a portion of second highway 320, as well as other roads in close proximity, including roads that have exits from second highway 320. Method 800 may be used to determine one or more matches with the third level of information associated with the target vehicle (e.g., the further enhanced data), as described above. In this embodiment, each instance of a successful match (e.g., the decision at operation 815 of method 800 is YES), is illustrated by an icon 940 on map 300 of target vehicle sector 905. As shown in FIG. 9, a series of icons 940 are located along second highway 320 within target vehicle sector 905. That is, FIG. 9 illustrates that multiple instances of successful matches to the further enhanced data associated with the target vehicle have been found within target vehicle sector 905. Additionally, as described above, the further enhanced data represented by icons 940 may be used to determine the location and direction of travel of the target vehicle within the target vehicle sector 905 to report to the authorities.

Figure 10:
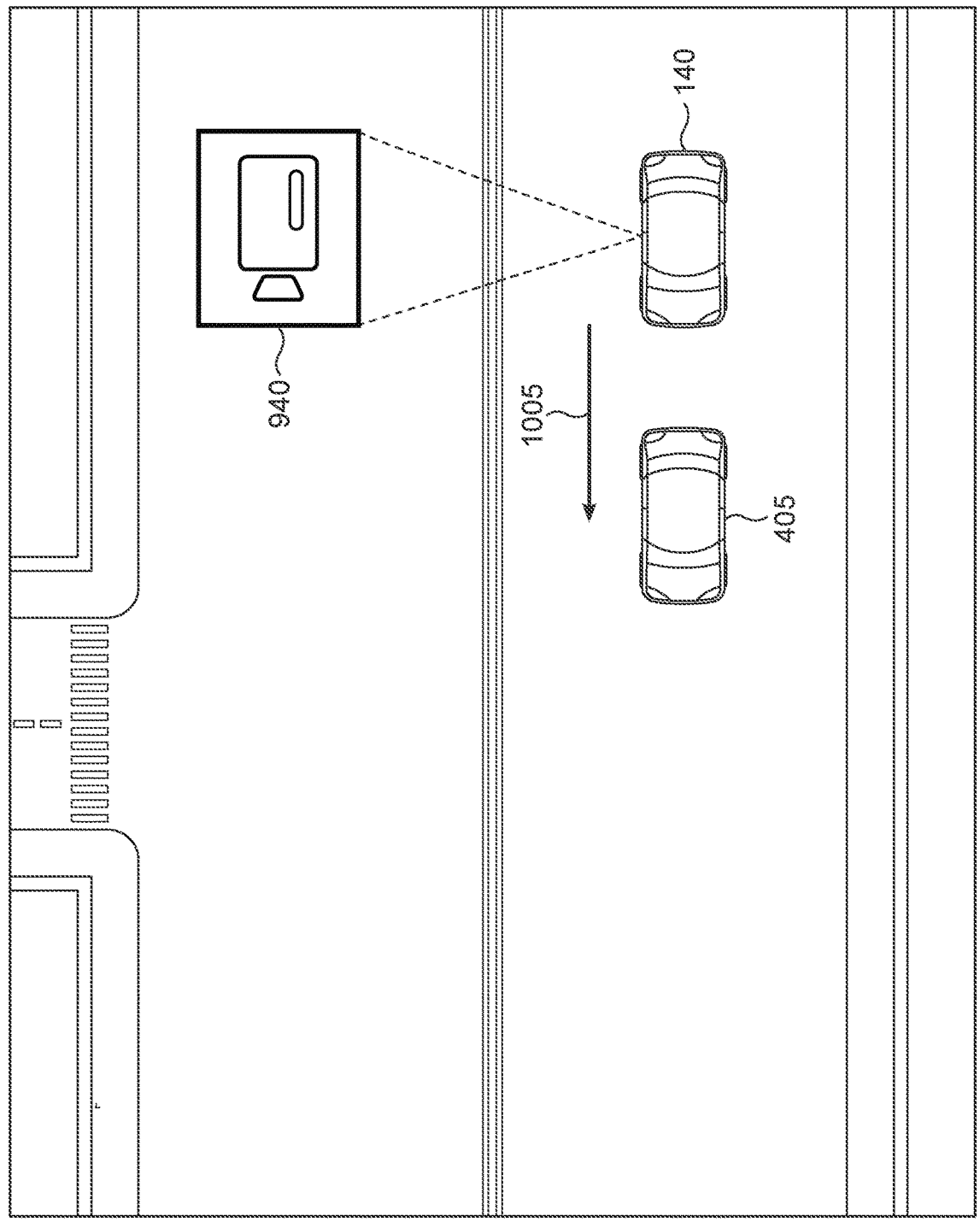
FIG. 10 is a representational view of an example embodiment of a target vehicle being followed by a second vehicle.

Referring now to FIG. 10, a representational view of an example embodiment of target vehicle 405 being followed by a participating vehicle is shown. In this embodiment, a participating vehicle, for example, first vehicle 140, is traveling within target vehicle sector 905, as shown in FIG. 9 above. As shown in FIG. 10, in response to the request for the third level of information associated with target vehicle 405 (e.g., further enhanced data), a data-gathering sensor in first vehicle 140 captures live video and/or high-resolution images of target vehicle 405. The further enhanced data captured by first vehicle 140 may be more detailed than the previous enhanced data to not only identify characteristics associated with target vehicle 405, but also to capture information about the target vehicle occupants and/or to provide real-time data, such as live video or current speed, direction, and/or heading information.

For example, as shown in this embodiment, the further enhanced data captured by first vehicle 140 as represented by icon 940 may include a direction 1005 of target vehicle 405, as well as speed or other data associated with target vehicle 405. First vehicle 140 may then send the captured further enhanced data to server 110 of system 100 for further analysis and processing according to the techniques described herein, including providing the information associated with target vehicle 405 to the authorities, as described above. With this arrangement, a location of a target vehicle may be rapidly detected according to the techniques described herein.

Figure 11:
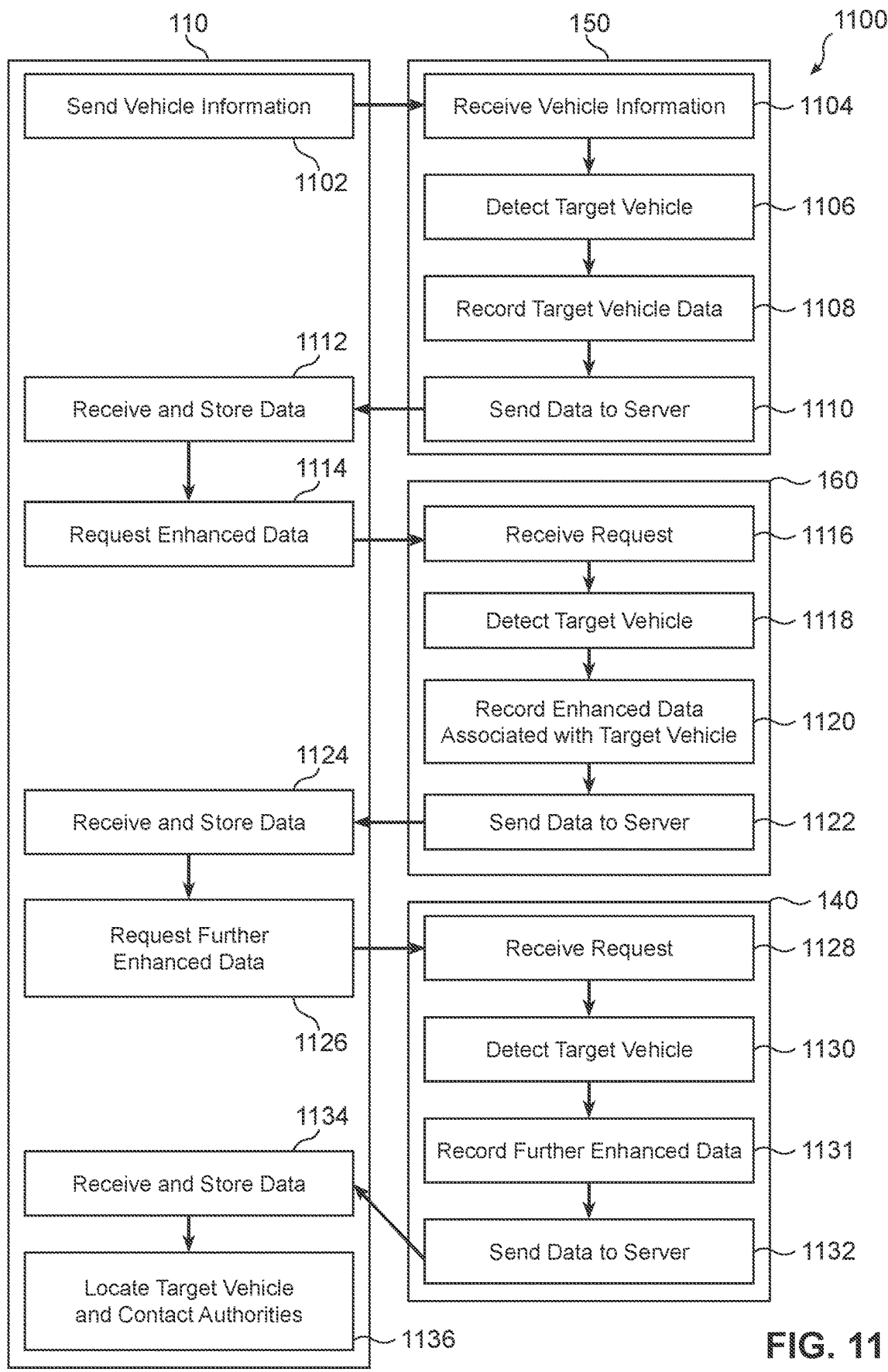
FIG. 11 is a flowchart of an example embodiment of a method of communication between a server and multiple vehicles for rapid graduated vehicle detection.

Referring now to FIG. 11, a flowchart of an example embodiment of a method 1100 of communication between server 110 of system 100 and multiple participating remote devices (e.g., vehicles and/or mobile devices) for rapid graduated vehicle detection is shown. It should be understood that the operations of each of the methods described above (i.e., methods 200, 500, 800) may be implemented sequentially or successively by server 110 of system 100 in order to rapidly increase bandwidth and increase complexity to identify and confirm a location of a target vehicle based on information received from participating remote devices in a geographic area. Method 1100 illustrates an example scenario of using the mechanisms described above in one embodiment. Other embodiments of method 1100 may include additional or different operations than those illustrated in this example.

In this embodiment, method 1100 includes operations performed by server 110 of system 100, as well as operations performed by one or more of the participating remote devices, including third vehicle 150, fifth vehicle 160, and first vehicle 140. As shown in FIG. 11, method 1100 begins with an operation 1102 where server 110 sends information associated with the target vehicle to the participating remote devices. For example, server 110 may send out the first level of information associated with the target vehicle (e.g., a license plate number) via network 105, as described above in reference to FIG. 2.

Next, method 1100 includes an operation 1104 where at least one of the participating remote devices, for example, third vehicle 150, receives the information associated with the target vehicle. At an operation 1106, third vehicle 150 uses one or more of its data-gathering sensors to detect the target vehicle. For example, third vehicle 150 may detect the target vehicle as described above with reference to method 200 of FIG. 2. Method 1100 may then proceed to an operation 1108, where third vehicle 150 records the data associated with the target vehicle detected at operation 1106, and, at an operation 1110, third vehicle 150 sends that data to server 110 of system 100.

At an operation 1112, server 110 receives the data associated with the target vehicle from third vehicle 150 and stores the data. For example, server 110 may store the data or information associated with the target vehicle in database 120 or other memory storage. Next, having successfully found a match with the first level of information requested about the target vehicle, server 110 may now request enhanced data about the target vehicle at an operation 1114. For example, as described above, server 110 may request a second level of information about the target vehicle, such as enhanced data that includes images and/or video.

Next, method 1100 includes an operation 1116 where at least one of the participating remote devices, for example, fifth vehicle 160, receives the request for enhanced data associated with the target vehicle. At an operation 1118, fifth vehicle 160 uses one or more of its data-gathering sensors to detect the target vehicle. For example, fifth vehicle 160 may detect the target vehicle as described above with reference to method 500 of FIG. 5. Method 1100 may then proceed to an operation 1120, where fifth vehicle 160 records the enhanced data associated with the target vehicle detected at operation 1118, and, at an operation 1122, fifth vehicle 160 sends that data to server 110 of system 100.

At an operation 1124, server 110 receives the enhanced data associated with the target vehicle from fifth vehicle 160 and stores the data, as described above in reference to operation 1112. Next, having successfully found a match with the second level of information requested about the target vehicle, server 110 may now request further enhanced data about the target vehicle at an operation 1126. For example, as described above, server 110 may request a third level of information about the target vehicle, such as further enhanced data that includes live or real-time video and/or high-resolution images.

Next, method 1100 includes an operation 1128 where at least one of the participating remote devices, for example, first vehicle 140, receives the request for further enhanced data associated with the target vehicle. At an operation 1130, first vehicle 140 uses one or more of its data-gathering sensors to detect the target vehicle. For example, first vehicle 140 may detect the target vehicle as described above with reference to method 800 of FIG. 8. Method 1100 may then proceed to an operation 1131, where first vehicle 140 records the enhanced data associated with the target vehicle detected at operation 1130, and, at an operation 1132, first vehicle 140 sends that data to server 110 of system 100.

At an operation 1134, server 110 receives the further enhanced data associated with the target vehicle from first vehicle 140 and stores the data, as described above in reference to operation 1112. Next, having successfully located the target vehicle, server 110 may now contact the authorities at an operation 1136 so that they may intercept or capture the target vehicle. With this configuration, method 1100 may be used to implement a graduated process of increasing bandwidth and increasing complexity to identify and confirm the location of a target vehicle in a geographic area.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

The invention claimed is:

1. A method for detection of a target vehicle, the method comprising:
   requesting, from one or more remote devices in a geographic area, information associated with a target vehicle;
   receiving, from the one or more remote devices, information associated with the target vehicle;
   determining whether the received information associated with the target vehicle matches the requested information; and
   upon determining that the received information matches the requested information, increasing at least one of a bandwidth or a complexity level of the requested information associated with the target vehicle and decreasing the geographic area associated with the request.

2. The method according to claim 1, wherein the one or more remote devices include at least one data-gathering sensor in a vehicle traveling along a road in the geographic area.

3. The method according to claim 1, wherein the requested information associated with the target vehicle includes at least a license plate number.

4. The method according to claim 3, wherein the increased bandwidth or complexity level of the requested information associated with the target vehicle includes at least an image or video of the target vehicle.

5. The method according to claim 1, wherein determining whether the received information matches the requested information includes comparing the received information to a threshold value.

6. The method according to claim 5, wherein the threshold value is a match probability or percentage.

7. The method according to claim 1, further comprising sending information associated with the target vehicle to a law enforcement agency.

8. The method according to claim 7, wherein the information sent to the law enforcement agency includes at least one of a location or direction of the target vehicle in the geographic area.

9. A method for implementing a graduated process of increasing bandwidth and increasing complexity to identify and confirm a location of a target vehicle in a geographic area, the method comprising:
   requesting, from one or more remote devices in a first geographic area, a first level of information associated with a target vehicle;

receiving, from the one or more remote devices, information matching the first level of information associated with the target vehicle;

based on the received information matching the first level of information, calculating a second geographic area that is smaller than the first geographic area; and requesting, from one or more remote devices in the second geographic area, a second level of information associated with the target vehicle, wherein the second level of information has at least one of an increased bandwidth or an increased complexity than the first level of information.

10. The method according to claim 9, further comprising:

receiving, from the one or more remote devices in the second geographic area, information matching the second level of information associated with the target vehicle;

based on the received information matching the second level of information, calculating a third geographic area that is smaller than the second geographic area; and requesting, from one or more remote devices in the third geographic area, a third level of information associated with the target vehicle, wherein the third level of information has at least one of an increased bandwidth or an increased complexity than the second level of information.

11. The method according to claim 10, wherein the first level of information includes a license plate number for the target vehicle and the second level of information includes at least one of an image or video of the target vehicle.

12. The method according to claim 11, wherein the third level of information includes real-time video of the target vehicle.

13. The method according to claim 10, further comprising sending at least one of location or direction information associated with the target vehicle to a law enforcement agency.

14. The method according to claim 9, wherein the one or more remote devices include at least one data-gathering sensor in a vehicle.

15. The method according to claim 9, wherein the request for the first level of information is initiated in response to a request from a law enforcement agency.

16. A system for detection of a target vehicle, the system comprising:

a plurality of remote devices associated with vehicles traveling along roads in a geographic area;

a server including a processor in communication with the plurality of remote devices via a communication network;

wherein the processor of the server is configured to:
request, from the plurality of remote devices, information associated with a target vehicle;
receive, from one or more remote devices of the plurality of remote devices, information associated with the target vehicle;
determine whether the received information associated with the target vehicle matches the requested information; and
upon determining that the received information matches the requested information, increase at least one of a bandwidth or a complexity level of the requested information associated with the target vehicle and decrease the geographic area associated with the request.

17. The system according to claim 16, further comprising:

a law enforcement agency in communication with the server via the communication network, wherein the law enforcement agency is configured to initiate the request from the server; and wherein the processor of the server is further configured to send at least one of location or direction information associated with the target vehicle to the law enforcement agency.

18. The system according to claim 16, wherein the requested information associated with the target vehicle includes at least a license plate number.

19. The system according to claim 18, wherein the increased bandwidth or complexity level of the requested information associated with the target vehicle includes at least an image or video of the target vehicle.

20. The system according to claim 16, wherein determining whether the received information matches the requested information includes comparing the received information to a threshold value.

* * * * *